United States Patent Office 3,162,608
Patented Dec. 22, 1964

3,162,608
ODOR IMPROVEMENT OF RESIN BEADS MADE THROUGH THE SULFONIUM SALT PROCESS
Leonard A. Mattano, Midland, Mich., assignor to The Dow Chemical Company, Midland, Mich., a corporation of Delaware
No Drawing. Filed Apr. 30, 1962, Ser. No. 191,328
2 Claims. (Cl. 260—2.1)

This invention concerns odor removal from resins derived from poly(vinylaryl sulfonium)halides.

In U.S. patent application Serial No. 89,647, filed February 16, 1961, there are disclosed resins derived from poly(vinylaryl sulfonium)halides by reacting the latter with a water-soluble nucleophile, e.g., disodium iminodiacetate, sodium sulfite, sodium glycinate, trisodium mercaptosuccinate, dimethyl ethanol amine, diethylene triamine, etc. Also in U.S. patent application Serial No. 734,397, filed May 12, 1958, there are disclosed thioether cation exchange resins containing vinylbenzylthio groups and having the following repeating units:

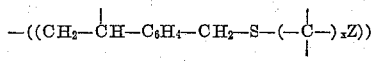

wherein

represents a hydrocarbonyl or substituted hydrocarbonyl group of the aliphatic, aromatic or cycloaliphatic series, $x$ is an integer not greater than 2 and Z is $-CO_2H$, $-P(O)(OH)_2$, $-SO_3H$, or exchangeable salts thereof. Such resins are prepared by reacting a poly(vinylbenzyl sulfonium)halide with a water-soluble mercaptide having the formula

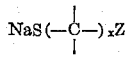

wherein

$x$ and $Z$ have the significance previously given.

The resins referred to are advantageously used as ion exchangers. However, they have an objectionable sulfide odor which limits their use where such an odor is undesirable. The sulfide odor is attributable in part to retained sulfide liberated during the course of their preparation and in part to a minor proportion (up to several percent) of unreacted poly(vinylbenzyl sulfonium)halide. The sulfides contain 1 or 2 alkyl groups containing between 1 and 4 carbon atoms and/or correspondingly 1 or 2 hydroxyalkyl groups containing between 2 and 4 carbon atoms, e.g., dimethyl, diethyl, methyl, hydroxyethyl, dipropyl, dibutyl, etc. sulfides.

It has now been discovered that the offensive sulfide odor attributable to such sulfur compounds can be removed by treating such particulate ion exchange resins with an aqueous dilute ca. 2.5–7 weight percent alkali metal or ammonium hypochlorite solution or with an aqueous dilute ca. 3–7 percent hydrogen peroxide solution at a temperature ranging between about 20° and 90° C., until a test portion after water-washing no longer has an offensive odor. Usually several hours' contact of the resin with dilute hypochlorite or hydrogen peroxide is required. At least an equimolar proportion of hypochlorite or peroxide, resin polymer unit basis, is used, preferably an excess. The amount of excess is not important, since excess can be recovered by filtering off excess hypochlorite or peroxide. The resin is washed free of hypochlorite or peroxide with water.

In practice, the water-swollen resin beads containing sulfur in the sulfide and sulfonium form are mixed with about 0.1 to 20 moles of said dilute hypochlorite or peroxide, preferably from about 0.3 to 5 holes thereof per mole of sulfonium derived resin, polymer unit basis, and the mixture is allowed to stand at room temperature or is heated, as desired, until a test portion, water-washed, no longer has an offensive odor. Thereafter, the resin beads are separated from the aqueous reaction medium, advantageously by filtering, and water washed if desired.

The following examples illustrate specific embodiments of this invention.

*Example 1*

A quantity of 100 grams of water-swollen sulfonium resin beads, prepared by reacting one weight percent divinylbenzene-crosslinked polymeric vinylbenzyl chloride with dimethyl sulfide by the method shown in U.S. patent application Serial No. 89,647, filed February 16, 1961, is reacted with disodium iminodiacetate by the method shown in the same application. The washed water-wet cation exchange resin so obtained has an offensive sulfide odor. The water-wet beads are gradually heated up to 90° C. with 333 grams of aqueous 5.25 weight percent sodium hypochlorite for about 2 hours. The beads are then washed free of hypochlorite with water.

Any of the resins prepared by the sulfonium route as described in U.S. Patent applications Serial Nos. 89,647 and 734,397 can be processed by the method of this invention to destroy the offensive sulfide odor which normally accompanies them.

*Example 2*

Fifteen grams of the water-wet cation exchange resin prepared as in Example 1 was stirred with 50 mls. of aqueous 5.25 percent sodium hypochlorite and allowed to stand for 3 to 4 hours. The beads were filtered off, water washed until free of hypochlorite and were then free from offensive sulfide odor.

*Example 3*

The procedure of Example 2 when repeated substituting aqueous 3 percent hydrogen peroxide for the hypochlorite gives a porduct free from sulfide odor.

What is claimed is:
1. A method for removing offensive odors from ion exchange resins having a malodor due to the presence therein of offensive sulfur compounds of the group consisting of dialkyl sulfides, di(hydroxyalkyl)sulfides, alkyl hydroxyalkyl sulfides and poly(vinylbenzyl sulfonium)halide, wherein the alkyl groups contain between 1 and 4 carbon atoms, and hydroxyalkyl groups contain between 2 and 4 carbon atoms and halide is a member of the group consisting of chloride and bromide, as impurities incidental to the preparation of ion exchange resins which are heat reaction products of a poly(vinylbenzyl sulfonium) anion exchange resin having sulfonium group substituents which give rise to the malodorous sulfur compounds and a member of the group consisting of alkali metal sulfites; alkali metal salts of aminocarboxylic acids; alkali metal salts of aminoalkane sulfonates; alkali metal salts of aminoaryl sulfonates; alkali metal salts of aminoalkane phosphonates; alkali metal salts of mercaptides having substituent groups of the group consisting of $-CO_2^-$, $-PO_3^=$ and $-SO_3^-$; polyethylene polyamines having up to 3 ethylene groups; primary aliphatic monoamines; secondary aliphatic monoamines; and tertiary aliphatic monoamines; by treating said malodorous resin in particulate form in water at a temperature between about 20° and about 90° C. with about $1/10$ to about 20 moles of dilute aqueous oxidant of the the group consisting of hydrogen peroxide and alkali metal and ammonium hypochlorites per mole of said ion exchange resin until a test sample of the resin after water washing no longer has an offensive odor.

2. The method of claim 1, wherein the so-treated resin is washed free of oxidant with water.

References Cited in the file of this patent
UNITED STATES PATENTS 2,977,328    Mattano    Mar. 28, 1961

FOREIGN PATENTS 1,114,270    Germany    Sept. 28, 1961

OTHER REFERENCES

Noller: Chemistry of Organic Compounds, pages 278, 279 and 283, Saunders Co., Philadelphia (1957).